US011991017B2

(12) United States Patent
Sekine (10) Patent No.: US 11,991,017 B2
(45) Date of Patent: *May 21, 2024

(54) AUTOMATIC REPORT CREATION SYSTEM

(71) Applicant: INTERACTIVE SOLUTIONS CORP., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 18/087,775

(22) Filed: Dec. 22, 2022

(65) Prior Publication Data

US 2023/0131018 A1 Apr. 27, 2023

Related U.S. Application Data

(63) Continuation of application No. 17/441,283, filed as application No. PCT/JP2020/005197 on Feb. 10, 2020, now Pat. No. 11,570,014.

(30) Foreign Application Priority Data

May 14, 2019 (JP) .................................. 2019-091139

(51) Int. Cl.
*H04L 12/18* (2006.01)
*G10L 15/08* (2006.01)
*G10L 15/22* (2006.01)

(52) U.S. Cl.
CPC .......... *H04L 12/1831* (2013.01); *G10L 15/08* (2013.01); *G10L 15/22* (2013.01); *H04L 12/1818* (2013.01); *G10L 2015/088* (2013.01)

(58) Field of Classification Search
CPC ... G10L 15/08; G10L 15/22; G10L 2015/088; H04L 12/1818; H04L 12/1831; G06Q 10/10
See application file for complete search history.

(56) References Cited

U.S. PATENT DOCUMENTS 5,572,728 A * 11/1996 Tada ........................ G06F 16/40
715/201
9,922,651 B1 * 3/2018 Nelson ...................... G06F 3/017
(Continued)

FOREIGN PATENT DOCUMENTS

DE 102013007248 A1 * 10/2014
EP 3131257 B1 * 5/2018
(Continued)

*Primary Examiner* — Daniel C Washburn
*Assistant Examiner* — Oluwadamilola M Ogunbiyi
(74) *Attorney, Agent, or Firm* — Pyprus Pte Ltd; George D. Liu (57) ABSTRACT

To provide an automatic report creation system which can automatically create reports for various different uses. This automatic report creation system included a voice recognition unit 3, a clock unit 7 and a term dictionary 9, wherein the voice recognition unit 3 recognizes the input of a pre-stored start term, the clock unit 7 calculates the start time on the basis of the time when the voice recognition unit 3 recognized input of the start term, the voice recognition unit 3 recognizes that a pre-stored end term has been inputted, the clock unit 7 calculates the end time on the basis of the time when the voice recognition unit recognized input of the end term, the voice recognition unit 3 stores speech from the start time to the end time as recorded speech, analyzes the recorded speech.

4 Claims, 4 Drawing Sheets

(56) References Cited

U.S. PATENT DOCUMENTS

| | | | | |
|---|---|---|---|---|
| 2004/0093256 A1* | 5/2004 | Garcia | ............... | G07C 1/12 |
| | | | | 705/7.21 |
| 2007/0183269 A1* | 8/2007 | Baba | ............... | G04G 13/026 |
| | | | | 368/110 |
| 2009/0241033 A1* | 9/2009 | Mujtaba | ............... | G09B 5/12 |
| | | | | 715/752 |
| 2012/0075338 A1* | 3/2012 | Curtis | ............... | H04W 4/021 |
| | | | | 709/204 |
| 2013/0325972 A1* | 12/2013 | Boston | ............... | G06Q 10/10 |
| | | | | 709/204 |
| 2014/0040780 A1* | 2/2014 | Artzt | ............... | G06Q 10/101 |
| | | | | 715/753 |
| 2014/0278389 A1* | 9/2014 | Zurek | ............... | G10L 15/20 |
| | | | | 704/231 |
| 2016/0246478 A1* | 8/2016 | Davis | ............... | G06F 3/04817 |
| 2016/0288923 A1* | 10/2016 | Hausmann | ............... | B64F 1/005 |
| 2016/0379629 A1* | 12/2016 | Hofer | ............... | G06F 40/284 |
| | | | | 704/257 |
| 2017/0010783 A1* | 1/2017 | Beattie | ............... | H04W 4/80 |
| 2017/0133007 A1* | 5/2017 | Drewes | ............... | G10L 15/063 |
| 2017/0180499 A1* | 6/2017 | Gelfenbeyn | ............... | H04L 51/02 |
| 2017/0345425 A1* | 11/2017 | Ikeno | ............... | G10L 15/08 |
| 2018/0018961 A1* | 1/2018 | Lee | ............... | G10L 15/08 |
| 2018/0063200 A1* | 3/2018 | Chan | ............... | H04L 12/1831 |
| 2018/0218734 A1* | 8/2018 | Somech | ............... | G10L 15/26 |
| 2019/0057335 A1* | 2/2019 | Dyer | ............... | G06Q 10/06311 |
| 2019/0156222 A1* | 5/2019 | Emma | ............... | G06F 16/22 |
| 2020/0066259 A1* | 2/2020 | Cronin | ............... | G10L 15/22 |
| 2020/0104363 A1* | 4/2020 | Sankoda | ............... | G06F 3/0237 |
| 2020/0159801 A1* | 5/2020 | Sekine | ............... | G06F 16/9538 |
| 2020/0211561 A1* | 7/2020 | Degraye | ............... | G10L 15/22 |
| 2022/0005466 A1* | 1/2022 | Nakamura | ............... | G10L 15/18 |

FOREIGN PATENT DOCUMENTS

| | | | |
|---|---|---|---|
| JP | 3813850 B2 | * | 8/2006 |
| KR | 102044526 B1 | * | 11/2019 |
| KR | 20200013152 A | * | 2/2020 |
| WO | WO-2020003851 A1 | * | 1/2020 |
| WO | WO-2020142567 A1 | * | 7/2020 |

* cited by examiner

AUTOMATIC REPORT CREATION SYSTEM

CROSS REFERENCES TO RELATED APPLICATIONS

This application is a continuation of application Ser. No. 17/441,283, filed Sep. 20, 2021, which is the National Stage of International Application No. PCT/JP2020/005197, filed Feb. 10, 2020, which claims the benefit of Japanese Application No. 2019-091139, filed May 14, 2019.

TECHNICAL FIELD

The present invention relates to an automatic report creation system.

BACKGROUND ART

JP2015-75792A discloses a report creation system utilizing a mobile terminal that is carried by a worker who performs maintenance/inspection work of a property. In this report creation system, maintenance/inspection results for each work target item of the property are consolidated by information based on speech input by the worker.

This report creation system automatically consolidates the information input by speech for each work target item of the property, and thus its use is limited to maintenance/inspection work of a property. Further, this system cannot convert arbitrary content into a report.

PRIOR ART DOCUMENTS

Patent Documents

Patent Document 1: JP2015-75792A

SUMMARY OF INVENTION

Technical Problem

An object of the invention disclosed in this specification is to provide an automatic report creation system which can automatically create reports for various different uses.

Solution to Problem

The above-described problems are based on, for example, the finding that a report can be automatically created by extracting, using a term dictionary, a necessary term from speech information included in a conversation. Further, in a preferred embodiment, the above-described problems are based on the finding that by incorporating a location information confirmation unit such as GPS so as to confirm location information and then specifying a place and time of a meeting or conference, etc., the place and start time of the meeting, etc. can be automatically ascertained.

One invention described in the present specification relates to an automatic report creation system.

This system 1 includes a voice recognition unit 3, a location information confirmation unit 5, a clock unit 7, and a term dictionary 9. The location information confirmation unit confirms the location of the automatic report creation system, and confirms that the automatic report creation system has been stagnant in a predetermined geographical range for a fixed duration of time or longer. Further, the location information confirmation unit identifies a meeting place in relation to the location of the automatic report creation system. The identified meeting place may be stored in a storage unit of the system as appropriate.

In this case, the clock unit calculates a start time on the basis of:
 a time at which the automatic report creation system began to be stagnant in the predetermined geographical range;
 a time at which speech was input into the voice recognition unit after the automatic report creation system began to be stagnant in the predetermined geographical range; or
 a time at which the voice recognition unit recognized that a pre-stored start term was input.

Further, the clock unit calculates an end time on the basis of:
 a time at which the automatic report creation system left the predetermined geographical range; or
 a time at which speech was last input into the voice recognition unit before the time at which the automatic report creation system left the predetermined geographical range.

The voice recognition unit stores speech from the start time to the end time as recorded speech, analyzes the recorded speech, and extracts and stores utterance keywords which are terms that are included in the term dictionary among the terms contained in the recorded speech.

Further, the automatic report creation system creates a file associated with the recorded speech, the file including information relating to the meeting place, the start time, the end time, and the utterance keywords. In this way, the system automatically creates a report.

A preferred example of the above-described system is explained below.

The location information confirmation unit displays candidates of the meeting place on the basis of the location information of the automatic report creation system, and stores, as the meeting place, a candidate that is input as the meeting place.

A preferred example of the above-described system is explained below.

The system is linked with a scheduler or a conference room reservation system,
 the system receives meeting information stored by the scheduler or conference room reservation system, and
 if the location information confirmed by the location information confirmation unit is related to information included in the meeting information, the system reads out meeting place information and/or attendant information included in the meeting information.

An alternative example of the automatic report creation system 1 includes the voice recognition unit 3, the clock unit 7, and the term dictionary 9.

The voice recognition unit 3 recognizes that a pre-stored start term has been input,
 the clock unit 7 calculates a start time on the basis of a time at which the voice recognition unit 3 recognized that the start term was input,
 the voice recognition unit 3 recognizes that a pre-stored end term has been input,
 the clock unit 7 calculates an end time on the basis of a time at which the voice recognition unit 3 recognized that the end term was input,
 the voice recognition unit 3 stores speech from the start time to the end time as recorded speech, analyzes the recorded speech, and extracts and stores utterance keywords which are terms that are included in the term dictionary 9 among the terms contained in the recorded speech, and the automatic report creation system 1 creates a file associated with the recorded speech, the file including information relating to the start time, the end time, and the utterance keywords.

Effects of Invention

This automatic report creation system can automatically create reports for various different uses.

DESCRIPTION OF EMBODIMENTS

In the following, embodiments for carrying out the present invention shall be described using drawings. The present invention is not limited to the embodiments described below, and may be appropriately modified from the embodiments below within a scope that would be obvious to a person skilled in the art.

Figure 1:
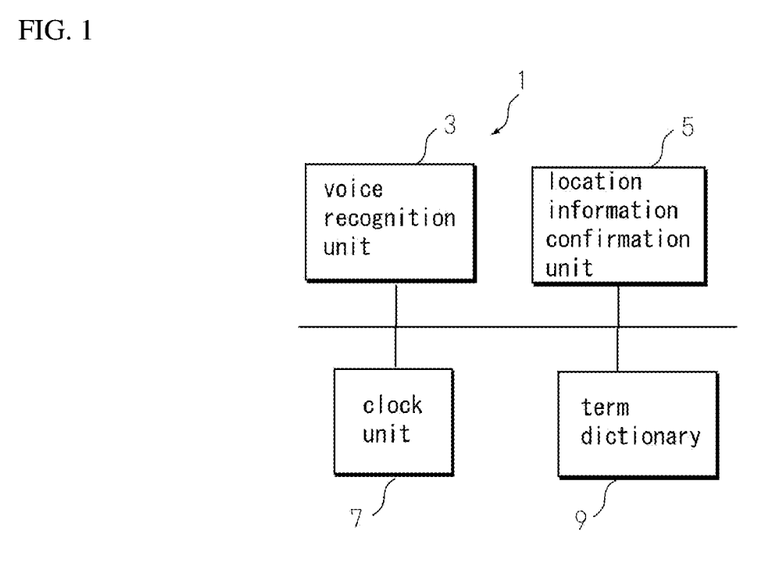
FIG. 1 is block diagram for explaining an automatic report creation system.

FIG. 1 is block diagram for explaining an automatic report creation system. As shown in FIG. 1, the system 1 includes a voice recognition unit 3, a location information confirmation unit 5, a clock unit 7, and a term dictionary 9. The system is preferably a system in which processing is automatically carried out by a computer. Further, the system may be a system capable of processing an input from a user as one piece of information if such an input is made.

Figure 2:
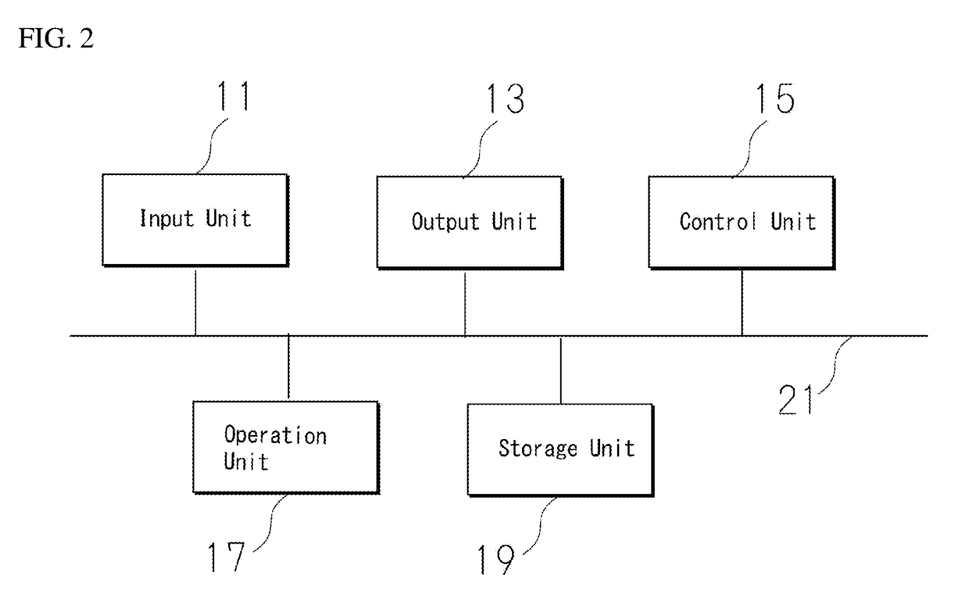
FIG. 2 is a block diagram illustrating the basic configuration of a computer.

FIG. 2 is a block diagram illustrating the basic configuration of a computer. As shown in FIG. 2, the computer includes an input unit 11, an output unit 13, a control unit 15, a calculation unit 17, and a storage unit 19, and these elements are connected by a bus 21 or the like so that information can be exchanged therebetween. For example, in the storage unit, a control program may be stored, and various types of information may also be stored. If a prescribed piece of information is input from the input unit, the control unit reads the control program stored in the storage unit. The control unit then reads, as appropriate, the information stored in the storage unit, and transmits the information to the calculation unit. The control unit also transmits to the calculation unit, as appropriate, the information that was input. The calculation unit performs a calculation process using the various pieces of received information, and stores the result in the storage unit. The control unit reads the calculation result that was stored in the storage unit, and the result is output from the output unit. In this way, various processes are executed. These various processes are executed by various means.

When (a user carrying) the automatic report creation system 1 moves, the location information confirmation unit 5, such as a GPS, stores the location of the automatic report creation system 1 in the storage unit as necessary. The clock unit 7 is a means that can calculate and store times, and measure a duration of time. For example, if the automatic report creation system 1 is stagnant in a fixed range (for example, within 10 m) for a predetermined duration of time or longer (for example, 1 minute or longer), the place where the system 1 is stagnant is stored as a meeting place. Therefore, information related to a fixed duration of time and a fixed range is stored in the storage unit. The system 1 receives the location information of the system 1 from the location information confirmation unit 5, and the system 1 reads the information related to the fixed duration of time and the fixed range from the storage unit. The system 1 then determines whether the system 1 has been present in the fixed range for the fixed duration of time using the time information from the clock unit 7, the location information of the system 1 from the location information confirmation unit 5, and the information related to the fixed duration of time and the fixed range that was read. If it is determined that the system 1 has been present in the fixed range for the fixed duration of time or longer, the system 1 may store, in the storage unit, the location at which the system 1 is present as the meeting place. In this way, the location information confirmation unit 5 confirms the location of the automatic report creation system 1, and confirms that the automatic report creation system 1 has been stagnant in a predetermined geographical range for a fixed duration of time or longer. Upon doing so, the location information confirmation unit 5 stores the meeting place in relation to the location of the automatic report creation system 1.

In this case, the clock unit 7 calculates a start time on the basis of:

(1) a time at which the automatic report creation system 1 began to be stagnant in the predetermined geographical range;

(2) a time at which speech was input into the voice recognition unit 3 after the automatic report creation system 1 began to be stagnant in the predetermined geographical range; or (3) a time at which the voice recognition unit 3 recognized that a pre-stored start term was input. Any one of these times may be set in advance in the system.

The time indicated in (1) above will now be explained. As mentioned above, in the system 1, the clock unit 7 stores times. Further, the location information confirmation unit 5 stores the location of the system 1. Therefore, if it is determined that the system 1 has been present in the fixed range for the fixed duration of time or longer, the system 1 may read, from the storage unit of the clock unit 7, the time at which the system 1 began to be present within the fixed range and set this time as the start time.

The time indicated in (2) above will now be explained. The voice recognition unit 3 has, for example, a sound collecting function. The voice recognition unit 3 records, as appropriate, speech that is input into the system 1, and stores the speech in the storage unit. When doing so, the voice recognition unit 3 may analyze the terms contained in the speech. The system 1 may obtain information related to the time from the clock unit 7, and store, in the storage unit, each term together with the time at which the term was input into the system 1. As indicated above, if the automatic report creation system 1 has determined that the system 1 has been stagnant in a predetermined geographical range for a fixed duration of time or longer, the voice recognition unit 3 may (automatically) start recording, or the voice recognition unit 3 may be switched to an ON state. If the amount of speech (in particular, speech in a specific frequency region) that is stored in the storage unit reaches a fixed amount or more, the system 1 may determine that a meeting, etc. has started, and store the time thereof as the start time. In this case, for example, information related to the specific frequency region and information related to a fixed amount of speech are stored in the storage unit and read out as appropriate, and speech information stored in the storage unit is compared to the information related to the specific frequency region and the information related to the fixed amount of speech that were read from the storage unit, so as to determine that the amount of speech in the specific frequency region among the speech information stored in the storage unit is equal to or greater than a fixed amount. In this way, the automatic report creation system 1 can set, as the start time, a time at which speech was input into the voice recognition unit 3 after the system 1 began to be stagnant in the predetermined geographical range, and then store the start time in the storage unit.

Finally, the time indicated in (3) above will now be explained. Explanation of any portions in this case which are similar to those of (2) above shall be omitted. The term dictionary 9 stores, for example, one or a plurality of start terms related to the start of a meeting. Examples of such start terms include "thank you for waiting", "hello", "please", "thank you", "let's begin", and "let's start". The voice recognition unit 3 stores speech in the storage unit. At this time, for example, information related to the time at which each term was input into the system 1 is received from the clock unit 7, and information related to the time can be stored together with a recognized term in the storage unit. The system 1 reads the terms stored as start terms from the term dictionary 9. The system 1 then determines whether any of the terms (conversation terms) that were stored in the storage unit matches the start terms that were read. If a term (conversation term) that was stored in the storage unit matches one of the start terms, the time at which this conversation term was input into the system 1 is read from the storage unit. Therein, the clock unit 7 of the system 1 may calculate this time. The time which is read is then stored in the storage unit as the start time. In this way, the system 1 can calculate the start time on the basis of a time at which the voice recognition unit 3 recognized that a pre-stored start term was input.

In an alternative example of the time indicated in (3) above, for example, the user may arrive at the meeting place and turn on the power source of the system 1 immediately before the meeting starts, and upon speaking a start term (e.g. "start"), the system 1 recognizes that the meeting has started and receives, from the clock unit, the time at which the start term was input into the system 1 and stores this time as the start time in the storage unit. At this time, the location information confirmation unit 5 may store, in the storage unit, the place where the system 1 is located as the meeting place.

In the above example of (3), the start time can be set as the time when a term to be used in a meeting, etc. is uttered, and thus, for example, a situation in which the system mistakenly determines that a meeting has started because the user gets caught in a traffic jam while traveling to the meeting and the user's car has been stopped for a fixed duration of time or longer can be prevented. Further, for example, a situation in which the system mistakenly determines that a meeting has started because the user has been sitting in a waiting area for a fixed duration of time or longer when changing trains or buses can also be prevented.

The clock unit 7 also calculates an end time on the basis of:
(1) a time at which the automatic report creation system 1 left the predetermined geographical range;
(2) a time at which speech was last input into the voice recognition unit 3 before the time at which the automatic report creation system 1 left the predetermined geographical range; or
(3) at time at which the voice recognition unit recognized that a pre-stored end term was input. Any one of these times may be set in advance in the system.

The time indicated in (1) above will now be explained. As mentioned above, in the system 1, the clock unit 7 stores times. Further, the location information confirmation unit 5 stores the location of the system 1. Therefore, if it is determined that the system 1 has left the fixed geographical range, the system 1 may determine that the meeting has ended, read, from the storage unit of the clock unit 7, the time at which the system 1 left the fixed geographical range, and set this time as the end time.

The time indicated in (2) above will now be explained. The system 1 obtains, for example, information related to the time from the clock unit 7, and stores in the storage unit the terms that were analyzed by the voice recognition unit together with the time that speech was input into the system 1 (and thus into the voice recognition unit 3). In other words, the system 1 stores, in the storage unit, each term and the time at which the term was spoken. The location information confirmation unit 5 stores the location of the system 1, and the system 1 analyzes the above-mentioned location information and confirms that the system 1 has left the predetermined geographical range. Since the system 1 stores each term and the time at which the term was spoken, the system 1 can set, as the end time, a time at which the last term was spoken before the time at which the system 1 left the predetermined geographical range. In this way, the automatic report creation system 1 can set, as the end time, a time at which speech was last input into the voice recognition unit 3 before the time at which the system 1 left the predetermined geographical range, and then store this end time in the storage unit.

Finally, the time indicated in (3) above will now be explained. Explanation of any portions in this case which are similar to those of (2) above shall be omitted. The term dictionary 9 stores, for example, one or a plurality of end terms related to the end of the meeting. Examples of such end terms include "thank you", "let's finish", "good job", and "thank you for coming". The voice recognition unit 3 stores speech in the storage unit. The system 1 reads the terms stored as end terms from the term dictionary 9. The system 1 then determines whether any of the terms (conversation terms) that were stored in the storage unit matches the end terms that were read. If a term (conversation term) that was stored in the storage unit matches one of the end terms, the time at which this conversation term was input into the system 1 is read from the storage unit. The time which is read is then stored in the storage unit as the end time. In this way, the system 1 can calculate the end time on the basis of a time at which the voice recognition unit recognized that a pre-stored end term was input, and then store the end time.

In an alternative example of the time indicated in (3) above, for example, when the user is leaving the meeting place, the user turns on the power source of the system 1, and upon speaking an end term (e.g. "end recording"), the system 1 recognizes that the meeting has ended and receives, from the clock unit, the time at which the end term was input into the system 1 and stores this time as the end time in the storage unit. At this time, the system 1 may automatically turn off its power source.

The voice recognition unit 3 stores speech from the start time to the end time as recorded speech, analyzes the recorded speech, and extracts and stores utterance keywords which are terms that are included in the term dictionary 9 among the terms contained in the recorded speech.

A plurality of utterance keywords are stored in the term dictionary 9. The system 1 reads the utterance keywords from the term dictionary 9 and reads the conversation terms that were stored in the storage unit, and determines whether any of the conversation terms matches one of the utterance keywords. If a conversation term matches one of the utterance keywords, the utterance keyword is stored in the storage unit.

Next, the system creates data for a report.

The automatic report creation system 1 reads information stored in the storage unit that is related to the meeting place, the start time, the end time, and the utterance keywords. The system also reads data related to the recorded speech of a conversation that was stored in the storage unit. The system 1 then uses the information related to the meeting place, the start time, the end time, and the utterance keywords and the data related to the recorded speech that were read to create a file associated with the recorded speech, the file including the meeting place, the start time, the end time, and the utterance keywords. In this way, the system automatically creates a report.

Figure 3:
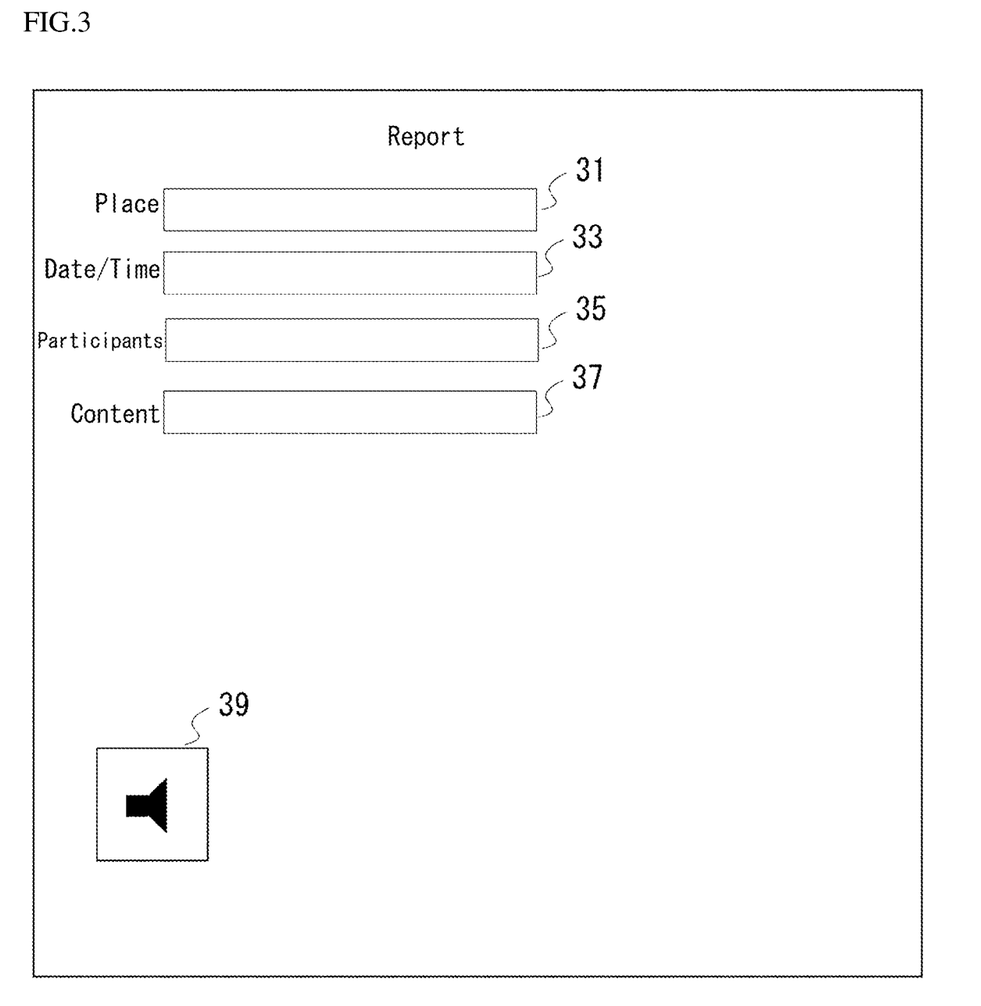
FIG. 3 is a schematic view illustrating an example of a format of a report.

FIG. 3 is a schematic view illustrating an example of a format of a report. Display data is created so that the information related to the meeting place that was stored in the storage unit and read is displayed at a position 31 related to the place. For example, data related to the meeting place that was read should be placed following the tag related to the place. Once such data is prepared, information related to the meeting place is displayed in the position 31 related to the place on the screen which displays the report. The date/time may also be displayed in a position 33 related to the date/time using the information related to the start time and the end time stored in the storage unit. The date/time may be displayed as the start time and the end time, or only the start time may be displayed, and then the difference between the end time and the start time is calculated so as to display the meeting duration. The one or a plurality of utterance keywords stored in the storage unit are displayed in a position 37 related to the content. Examples of utterance keywords include terms that must be explained in relation to a specific medicine. In this way, it can be easily checked whether all of the terms that must be explained have been spoken, as in the case of obtaining informed consent. Further, if all of the utterance keywords are not displayed in the position 37 related to the content, the content of the conversation can be checked using a speech file readout icon 39 to be explained later.

In addition, the utterance keywords which must be explained may also be stored in advance in the storage unit, and the system 1 may determine whether the utterance keywords included in the conversation match all of the necessary keywords. Thereupon, if the utterance keywords included in the conversation do not cover all of the necessary keywords, the system 1 can be configured so that information for calling attention is displayed in the report. To this end, terms or marks for calling attention may be stored in the storage unit, and in the case that the utterance keywords included in the conversation do not cover all of the necessary keywords, a process may be performed so that the terms or marks for calling attention which are stored in the storage unit are displayed in the report.

If participants have installed the same application, the concerned parties which participated in the same meeting can be ascertained by using the location information confirmation unit 5. In this case, the storage unit stores information related the user of a terminal in which each system is installed, and then control is performed so that the stored information related to the user is read and displayed in a position 35 which displays the participants.

Figure 4:
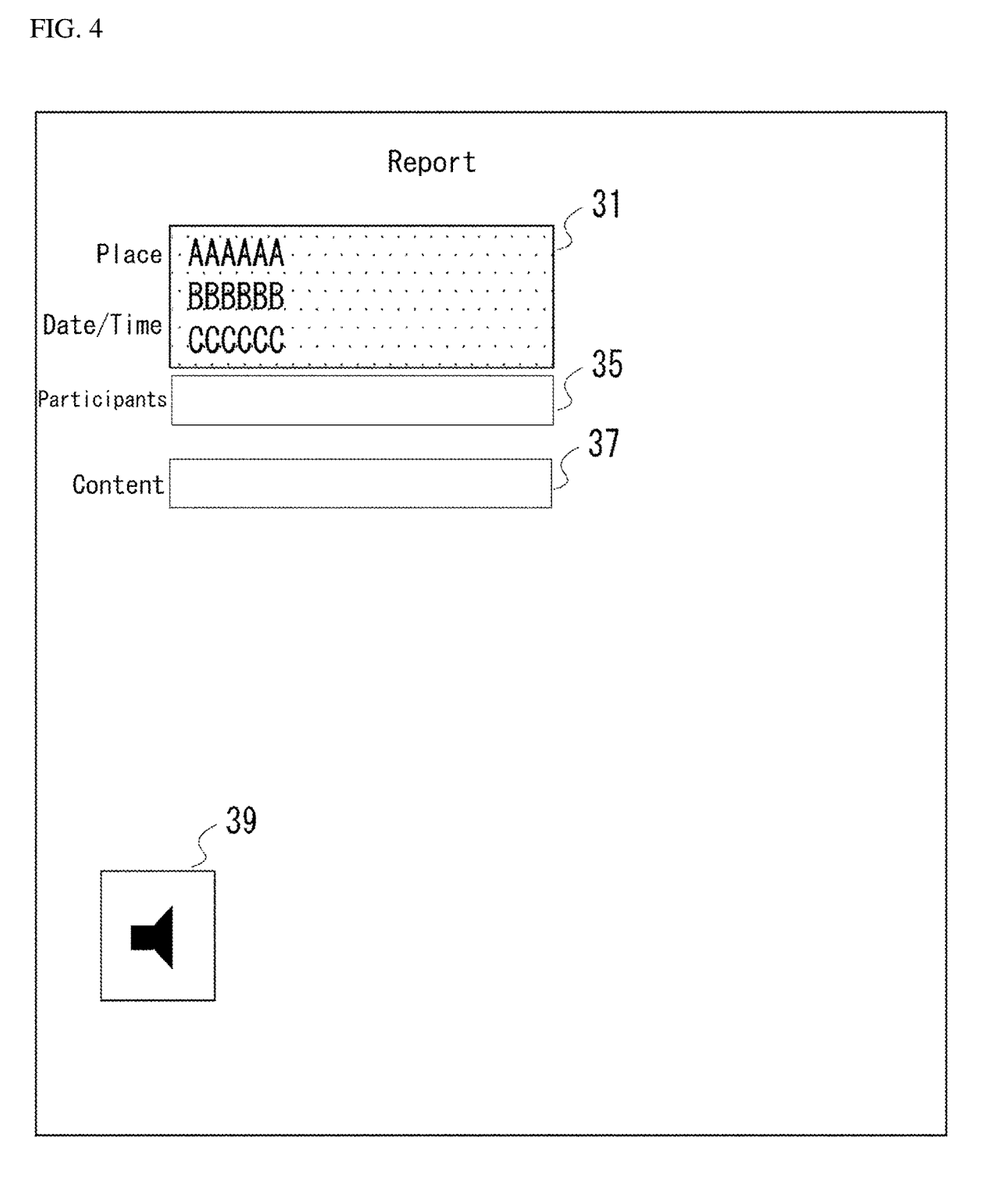
FIG. 4 is a schematic view illustrating a situation in which a plurality of company names are read from a storage unit and the company names which were read are displayed as place candidates.

The location information confirmation unit 5 may display candidates of the meeting place on the basis of the location information of the automatic report creation system 1, and store, as the meeting place, a candidate that is input as the meeting place.

For example, consider a case in which a plurality of companies are established in a building. In this case, information related to the companies, such as a plurality of company names, is recorded in the storage unit in association with the location of the building. The location information confirmation unit 5 confirms the location of the system 1, and reads the information related to the plurality of companies established in the building. The system 1 then reads, for example, the information related to the plurality of companies from the storage unit, and displays the plurality of company names in the position 31 of the report which is related to the place. The plurality of company names may be also displayed in a pull-down fashion. FIG. 4 is a schematic view illustrating a situation in which the plurality of company names are read from the storage unit, and the company names which have been read (AAAAAA, BBBBBB, and CCCCCC) are displayed as candidates of the place (meeting place). If the user selects a company name, the system 1 receives an input related to the company name. The system 1 then stores, in the storage unit, the company name that was input as the meeting place. In this way, candidates of the meeting place can be displayed, and the meeting place can be easily specified without manually inputting the meeting place.

Figure 5:
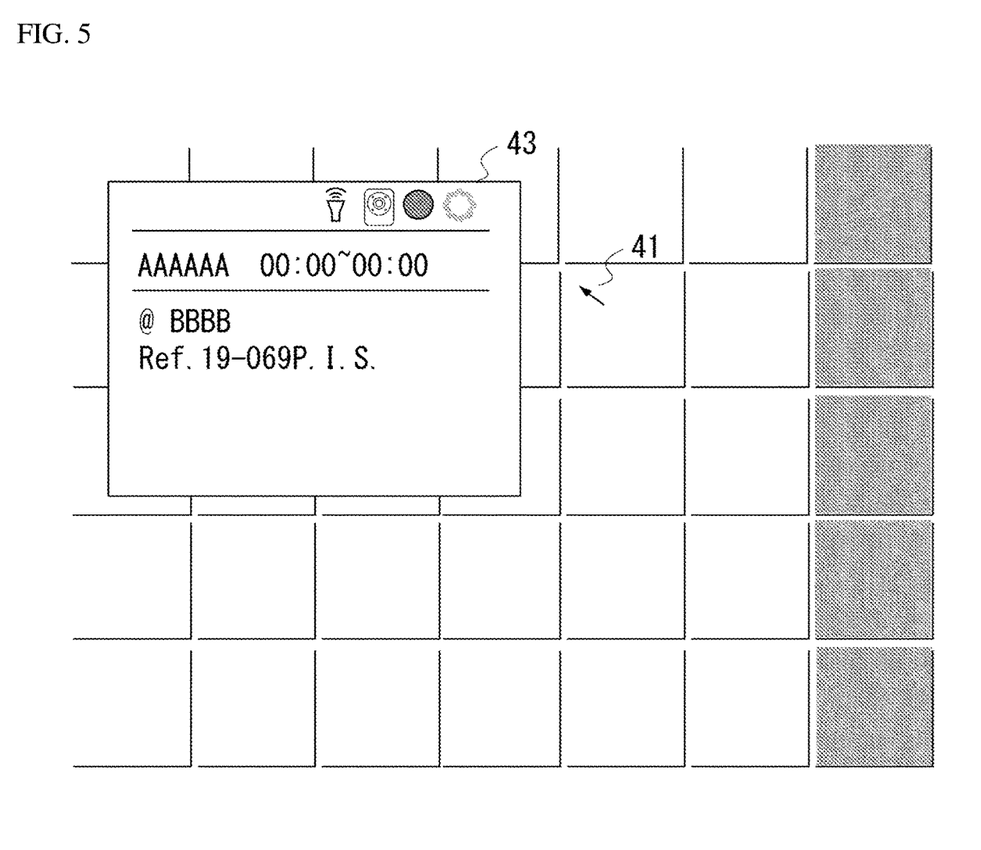
FIG. 5 is a schematic view illustrating an example of a display screen of a scheduler.

The system 1 may be linked with a scheduler or a conference room reservation system,
 the system 1 then receives meeting information stored by the scheduler or conference room reservation system, and
 if the location information confirmed by the location information confirmation unit 5 is related to information included in the meeting information, the system may read out meeting place information and/or attendant information included in the meeting information.

FIG. 5 is a schematic view illustrating an example of a display screen of a scheduler. In this example, if a date on the calendar is designated with an arrow icon 41, the schedule that is planned on that date is displayed on a schedule display screen 43. In this system, the schedule of each day is stored in the storage unit in association with that date. The schedule includes meeting information such as a meeting title and a meeting scheduled time, as well as a meeting place, planned attendants, and a meeting outline. The system 1 linked with the scheduler reads information related to the meeting place from the storage unit. If the location information confirmed by the location information confirmation unit 5 matches the meeting place, the system 1 may determine that the meeting place is correct. Further, the system 1 may read, from the storage unit, information about the planned attendants that is stored in relation to the meeting. The information related to the planned attendants that was read may be displayed in a column related to the attendants of the report explained above.

In an alternative embodiment of the automatic report creation system explained above, the system includes the voice recognition unit 3, the clock unit 7, and the term dictionary 9. The system is preferably a system in which processing is automatically carried out by a computer. Further, the system may be a system capable of processing an input from a user as one piece of information if such an input is made. This system also basically performs the same processing as the system explained above.

For example, the user speaks a start term toward the system. Upon doing so, this speech is input into the system. The voice recognition unit 3 confirms that a pre-stored start term has been input. For example, the term dictionary 9 stores one or a plurality of start terms. The voice recognition unit 3 stores the speech in the storage unit. The system 1 reads the terms stored as start terms from the term dictionary 9. The system 1 then determines whether any of the terms (conversation terms) that were stored in the storage unit matches the start terms that were read. If a term (conversation term) that was stored in the storage unit matches one of the start terms, the time at which this conversation term was input into the system 1 is read from the storage unit. Therein, the clock unit 7 calculates the start time on the basis of the time at which the voice recognition unit 3 recognized that a start term was input.

Further, for example, the user speaks an end term toward the system. Upon doing so, this speech is input into the system. The voice recognition unit 3 confirms that a pre-stored end term has been input. For example, the term dictionary 9 stores one or a plurality of end terms. The voice recognition unit 3 stores the speech in the storage unit. The system 1 reads the terms stored as end terms from the term dictionary 9. The system 1 then determines whether any of the terms (conversation terms) that were stored in the storage unit matches the end terms that were read. If a term (conversation term) that was stored in the storage unit matches one of the end terms, the time at which this conversation term was input into the system 1 is read from the storage unit. Therein, the clock unit 7 calculates the end time on the basis of the time at which the voice recognition unit 3 recognized that an end term was input.

The voice recognition unit 3 stores speech from the start time to the end time as recorded speech, and then the system 1 creates a recorded speech file. The system 1 analyzes the recorded speech, and extracts and stores utterance keywords which are terms that are included in the term dictionary 9 among the terms contained in the recorded speech. The system 1 then creates a file associated with the recorded speech, the file including information relating to the start time, the end time, and the utterance keywords.

The automatic report creation system 1 explained previously can be considered to result from further incorporating the location information confirmation unit 5 into the automatic report creation system of the above alternative embodiment.

INDUSTRIAL APPLICABILITY

The present invention can be utilized in fields related to information and communications.

REFERENCE SIGNS LIST

1: automatic report creation system
3: voice recognition unit
5: location information confirmation unit
7: clock unit
9: term dictionary

The invention claimed is:

1. A non-transitory computer-readable storage medium storing a program for causing a computer to be an automatic report creation system comprising:
   a speech recognition unit;
   a location information confirmation unit;
   a clock unit; and
   a term dictionary,
   wherein the location information confirmation unit confirms a location of the automatic report creation system, and if the automatic report creation system has been stagnant in a predetermined geographical range for a fixed duration of time or longer, the location information confirmation unit identifies a meeting place in relation to the location of the automatic report creation system,
   wherein the clock unit calculates a start time on the basis of:
      a time at which the automatic report creation system began to be stagnant in the predetermined geographical range;
      a time at which speech was input into the speech recognition unit after the automatic report creation system began to be stagnant in the predetermined geographical range; or
      a time at which the speech recognition unit recognized that a pre-stored start term was input,
   wherein the clock unit calculates an end time on the basis of:
      a time at which the automatic report creation system left the predetermined geographical range;
      a time at which speech was last input into the speech recognition unit before the time at which the automatic report creation system left the predetermined geographical range; or
      a time at which the speech recognition unit recognized that a pre-stored end term was input,
   wherein the speech recognition unit stores speech from the start time to the end time as recorded speech, analyzes the recorded speech, and extracts and stores utterance keywords which are terms that are included in the term dictionary among the terms contained in the recorded speech, and
   wherein the automatic report creation system creates a report associated with the recorded speech, the report including information relating to the meeting place, the start time, the end time, and the utterance keywords.

2. The non-transitory computer-readable storage medium according to claim 1, wherein the location information confirmation unit displays candidates of the meeting place on the basis of location information of the automatic report creation system, and stores, as the meeting place, a candidate that is input as the meeting place.

3. The non-transitory computer-readable storage medium according to claim 1, wherein the system is linked with a scheduler or a conference room reservation system,
   the system receives meeting information stored by the scheduler or conference room reservation system, and
   if the location information confirmed by the location information confirmation unit is related to information included in the meeting information, the system reads out meeting place information and/or attendant information included in the meeting information.

4. A non-transitory computer-readable storage medium storing a program for causing a computer to be an automatic report creation system comprising:
- a speech recognition unit;
- a clock unit; and
- a term dictionary,
- wherein the speech recognition unit recognizes that a pre-stored start term has been input,
- the clock unit calculates a start time on the basis of a time at which the speech recognition unit recognized that the start term was input,
- the speech recognition unit recognizes that a pre-stored end term has been input,
- the clock unit calculates an end time on the basis of a time at which the speech recognition unit recognized that the end term was input,
- the speech recognition unit stores speech from the start time to the end time as recorded speech, analyzes the recorded speech, and extracts and stores utterance keywords which are terms that are included in the term dictionary among the terms contained in the recorded speech, and
- the automatic report creation system creates a report associated with the recorded speech, the report including information relating to the start time, the end time, and the utterance keywords.

\* \* \* \* \*